United States Patent

[11] 3,587,807

[72] Inventor John B. Hickman
 Grand Prairie, Tex.
[21] Appl. No. 784,413
[22] Filed Dec. 17, 1968
[45] Patented June 28, 1971
[73] Assignee Zenith Equipment Manufacturing Company
 Dallas, Tex.

[54] COIN-ACTUATED CONTROL SYSTEM FOR A VEHICLE-WASHING STATION
 20 Claims, 2 Drawing Figs.

[52] U.S. Cl. ................................................ 194/13,
 134/68, 134/45, 134/123
[51] Int. Cl. ................................................ G07f 13/00
[50] Field of Search ......................................... 194/13, 3,
 (Inquired); 134/123, 45, 68, (Inquired)

[56] References Cited
 UNITED STATES PATENTS
 3,400,727 9/1968 Daum et al. .................. 134/123X
 3,447,546 6/1969 Burrup ........................ 134/123

Primary Examiner—Stanley H. Tollberg
Attorney—Richards, Harris and Hubbard

ABSTRACT: Apparatus for automatically washing a stationary vehicle in a washing bay including a coin-actuated control system for sequencing the overall operation. The coin-actuated control system includes an accumulator switch and a sequencing switch. The accumulator switch responds to the value of coins deposited in a coin switch to establish a program for the operation of the car washing apparatus. The car washing apparatus includes a nozzle assembly (rotating sprinklers) supported by a motor-driven trolley on a continuous track. Movement of the trolley around the continuous track operates a rail switch to actuate the sequencing switch to its various positions. As the sequencing switch moves to its various positions, the cleaning proceeds from a wash cycle, to a rinse cycle, and a wax cycle (if desired). When the washing station includes a wheel-washing mechanism, the coin-actuated control system also controls the timing cycle for wheel washing.

INVENTOR:
JOHN B. HICKMAN

Richards, Harris, & Hubbard
ATTORNEY

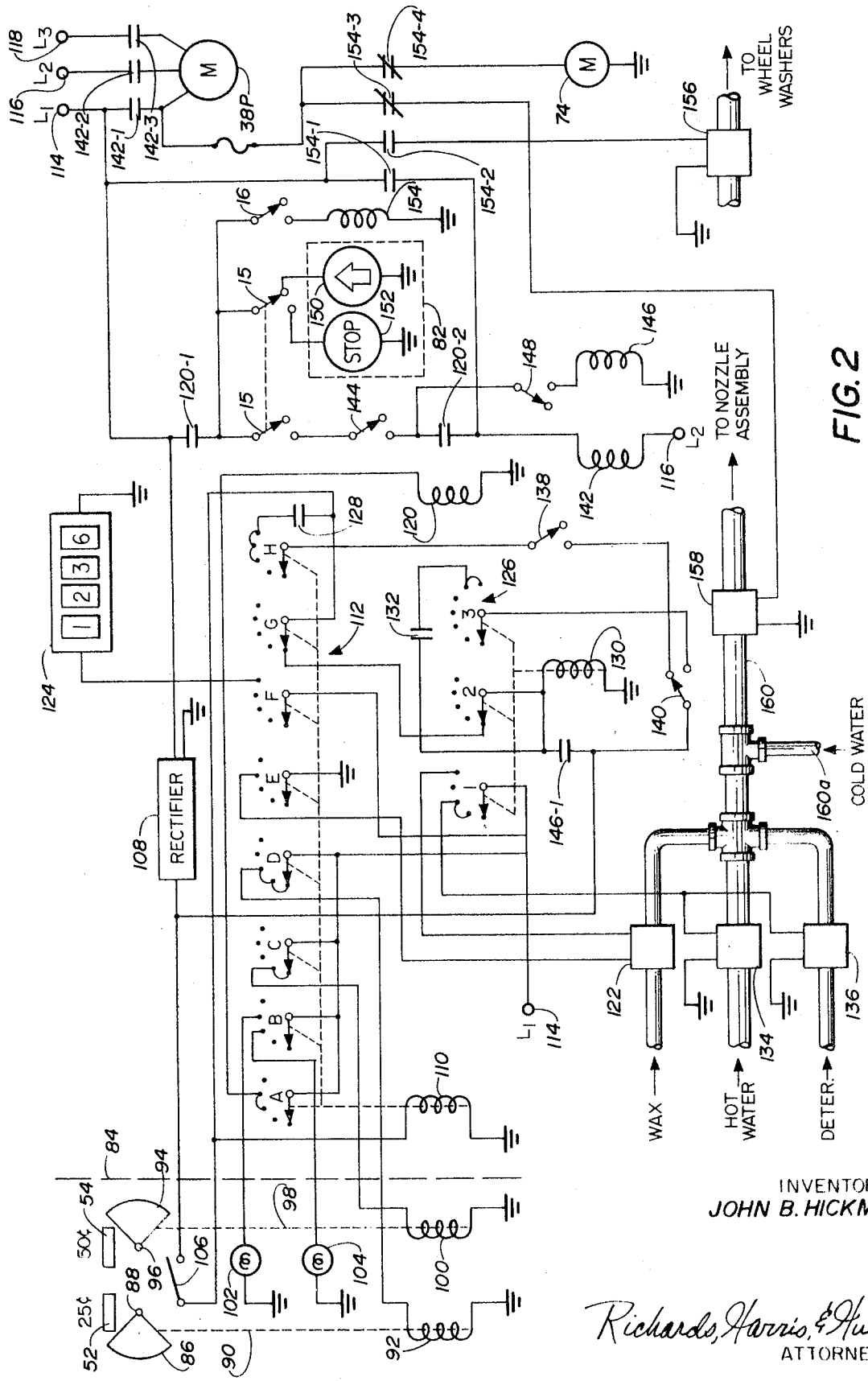

COIN-ACTUATED CONTROL SYSTEM FOR A VEHICLE-WASHING STATION

BACKGROUND OF THE INVENTION

This invention relates to an automobile-washing station, and more particularly, to a coin-actuated control system for a vehicle-washing station.

Automatic sit-through washing stations are fast becoming the most popular method of cleaning the exterior finish of an automobile. In such systems, the driver remains in his car while the washing equipment, in a carousel action, completely cleans the car exterior by means of cleaning and rinsing sprays subsequently applied.

Heretofore, car-washing stations usually consisted of a series of washing and drying bays through which a vehicle was either driven or towed by means of a moving chain. Such systems are not in the true sense completely automatic in that some wiping and drying is required to satisfactorily clean the automobile exterior. Because of the hand labor required, the cost of cleaning an automobile with such a system is relatively high. In addition, because of the large, complicated pieces of equipment required, frequent breakdowns and delays often necessitate long waiting periods.

The automatic coin-operated sit-through car wash provides the automobile owner with a relatively inexpensive method of maintaining the exterior finish of his car. The systems are automatic in the true sense of the word in that they do not require an attendant for any of the cleaning functions. The driver inserts the required number of coins in a coin slot and drives his auto into a washing bay. When he has driven over a wheel-actuated switch, a control system actuates various cleaning apparatus to commence the cleaning operation. Initially, a high-pressure cleaning solution cleans the front two tires and wheels. Next, the same high-pressure cleaning solution cleans the rear tires and wheels. After driving over another sensing device, the control system is actuated to commence a washing spray cycle. The washing spray cycle dispenses high-pressure streams of a water-detergent mixture over the entire exterior of the auto by means of rotating sprinkler assemblies. These sprinklers move around the parked vehicle a predetermined number of times as determined by the control system. After the washing spray cycle has been completed, a rinsing spray cycle commences to dispense high-pressure streams of clear water over the car to remove loosened dirt and detergent. The rinsing cycle spray continues for a number of revolutions, again determined by the control system. When desired, a waxing spray cycle is included in the last rinse to distribute high-pressure streams of clear water and wax over the car. Again, the waxing cycle is controlled by the control system. The exterior of the car is now cleaned and the driver proceeds from the washing station, thereby permitting another vehicle to be driven into place.

Because of the various cleaning, rinsing, and waxing operations, the control system for the automatic car wash systems is somewhat complex. Even though complex, it is expected that such control systems be reliable and capable of operating in a high humidity atmosphere. One of the most troublesome sections of car wash control systems is the coin-actuated switch. This is often located in the open and subject to customer abuse. Accordingly, it is an object of the present invention to provide a reliable coin-actuated control system for a car-washing station. Another object of the present invention is to provide a control system for a car-washing station actuated from a simplified coin switch. Still another object of this invention is to provide a programmed coin-actuated control system for a car-washing station.

In accordance with the present invention, there is provided a control system for a sit-through car-wash station employing an overhead continuous track for defining a path around which rotating sprinklers move during a washing and rinsing cycle. A multideck accumulator stepping switch is actuated through various program positions by means of a coin-operated switch. As the accumulator switch moves to its first position, a multideck sequencing switch is actuated to establish circuitry for commencing a car-washing cycle upon actuation of a wheel switch. Movement of a motor-driven trolley around the overhead continuous track steps the sequencing switch to various positions to sequence the cleaning cycle through its various operations. Upon completion of a washing cycle, a rinsing cycle, and a waxing cycle (where desired) the accumulator switch and sequencing switch are returned to a starting position.

A more complete understanding of the invention and its advantages will be apparent from the specification and claims and from the accompanying drawings illustrative of the invention.

BRIEF DESCRIPTION OF THE DRAWINGS

FIG. 2 is an electrical schematic of a control system for operation of a sit-through car-washing station in accordance with the present invention.

DESCRIPTION OF A PREFERRED EMBODIMENT

Figure 1:
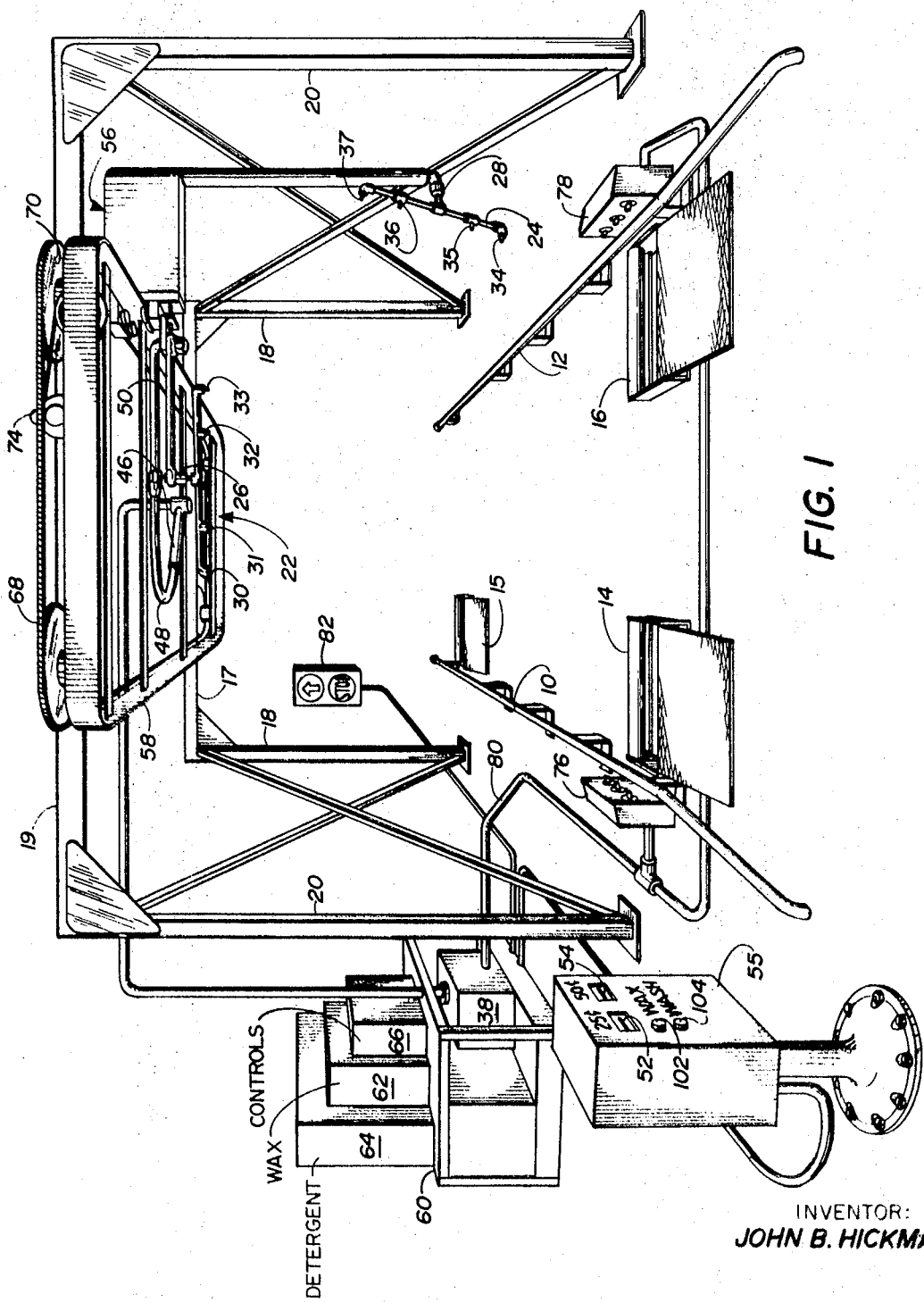
FIG. 1 is a perspective view of a coin-actuated sit-through car-washing station.

Referring now to the drawings, there is shown in FIG. 1 a sit-through car-washing station including guide tracks 10 and 12 and switching stations 14—16 for properly locating a vehicle with respect to the washing mechanism and for actuating the control system. The washing mechanism itself is supported above the parked vehicle by means of cross braces 17 and 19, and supporting legs 18 and 20, having a height sufficient to permit an automobile into the washing bay without interference from a horizontal rotating sprinkler 22.

In addition to the horizontally rotating sprinkler 22, which washes the upper surfaces of the vehicle, there is also a side-washing vertically oriented rotating sprinkler 24. The rotating sprinklers 22 and 24 are supported by rotating couplers 26 and 28, respectively, in the usual manner. Nozzles 30—33 of the rotating sprinkler 22 and nozzles 34—37 of the rotating sprinkler 24 are slanted at an angle such that high-pressure water will be discharged therefrom in a manner that imparts a rotating motion to the sprinklers.

As explained previously, a normal cleaning includes a washing cycle where high-pressure streams of a water-detergent mixture are discharged by the rotating sprinklers 22 and 24 against the exterior of a parked vehicle. Subsequent to the washing cycle, high-pressure streams of clear water are dispensed from the rotating sprinklers to rinse away the water-detergent mixture and the dirt loosened thereby. The water-detergent mixture and the clear rinse water are supplied to the rotating sprinklers 22 and 24 from a high-pressure pump 38 located adjacent the washing bay, usually separated by a wall (not shown). This high-pressure pump 38 supplies pressurized fluids to the rotating sprinklers by means of a piping arrangement and a swivel mounted pipe 46. A flexible hose 48 couples to the pipe 46 at one end and a pipe 50 on the other end.

Mounted above the pump 38 on a rack 60 are containers 62 and 64 and a control panel 66. The control panel 66 contains the coin-actuated control system of the present invention for sequencing the various washing and rinsing operations. The control system in the panel 66 is activated by means of one or more coins deposited in coin slots 52 and 54 in a coin box 55. The containers 62 and 64 are filled with liquid wax and detergent, respectively, for delivery by the pipe 50 to the rotating sprinklers 22 and 24. When desired, usually for an additional cost, a water-wax mixture may be dispensed by the rotating sprinklers during one revolution around the parked vehicle, usually as part of the last rinse. Since the piping arrangements for controlling the wax and detergent usage may take any one of many available variations, additional description will not be given.

To guide the rotating sprinklers 22 and 24 around the parked vehicle, a trolley 56 supports the sprinklers and associated piping on a continuous track 58. The track 58 is attached to the cross braces 17 and 19 by means of brackets welded thereto. The track 58 forms a rectangle with rounded corners and has a length and width sufficient to assure that the rotating sprinkler 24 will pass around a vehicle being washed.

Driving power for the trolley 56 is provided by means of a continuous chain 68 supported at the corners of the track 58 on sprockets. The sprocket 70 is driven by means of an electric motor 74 coupled thereto through a speed reducer.

As a vehicle is driven into the washing bay, the front wheels are washed by means of a high-pressure cleaning fluid dispensed from nozzle arrays 76 and 78. These arrays are supplied high-pressure fluid by means of a piping arrangement 80 connected to output of the pump 38. After the front wheels are washed, the rear wheels are washed in the same manner and the vehicle is driven further into the bay until the front left wheel engages the switch 15. Actuating the switch 15 energizes a signal light 82 that indicates the vehicle is properly positioned for the cleaning operation by the sprinklers 22 and 24.

Referring to FIG. 2, there is shown schematically a control system including the elements in the coin box 55 (to the left of line 84). The coin box 55 contains a first shutter 86 rotatable about a shaft 88. The shutter 86 rotates about the shaft 88 from the position shown to a position blocking the 25 cent coin slot 52 by means of a solenoid 92 through a mechanical connection 90. A similar mechanism, including a shutter 94 that rotates about a shaft 96 by means of a solenoid 100 through a mechanical linkage 98, blocks the 50 cent coin slot 54. To indicate to a customer the type of car washing service he has purchased, the coin box 55 includes a "Wash and Wax" light 102 and a "Wash Only" light 104.

Inserting a coin into the slot 52 or 54 closes a switch 106 (through standard mechanism) having one terminal connected to a stepping switch coil 110 and the deck G of a multideck accumulator switch 112. The rectifier 108, which may be any commercially available device, produces a DC voltage from the AC voltage appearing on terminal 114. The accumulator switch 112 is an eight-deck stepping switch having three active positions for establishing two separate programs for operation of a vehicle-washing station. Decks A, B, C and D are interconnected through wiper-arm contacts to the terminal 114. Positions two and three of deck A are interconnected to the coil 120 of a relay that includes two normally open contacts 120–1 and 120–2. When the wiper arm of deck B is in the second position, a circuit will be completed to the "Wash Only" light 104; in the third position, a circuit will be completed to the "Wash and Wax" light 102. The first two positions of deck C are interconnected to the solenoid 100 and the first three positions of the deck D are interconnected to the solenoid 92. For the fifth deck of the accumulator switch 112, (deck E), the third position contact connects to a solenoid valve 122 for controlling the dispensing of wax from the container 62 through the rotating sprinklers 22 and 24. The wiper-arm contact of deck E connects to ground. As the accumulator switch 112 moves to position four, a contact is made completing a circuit from the terminal 114 to a counter 124. The accumulator switch 112 steps to position four only after completion of a cleaning cycle; the counter 124 records the number of cycles completed. In the starting position of switch 112, deck G completes a circuit from the switch 106 to a sequencing switch 126. Positions two, three, and four of deck 8 of the switch 112 (deck H) are interconnected through an interrupter contact 128, the operation of which will be explained shortly, to the coil 110.

Deck G of the switch 112 connects to the middle deck of three of the sequencing switch 126. The wiper-arm contact of the middle deck, deck 2, is tied directly to a stepping coil 130 for the switch 126. The coil 130 is also connected to positions four and five of deck 3 of the switch 126 through an interrupted contact 132. Positions one and two of deck 1 of the switch 126 are interconnected to solenoid valves 134 and 136 for controlling the flow of hot water and detergent, respectively, to the rotating sprinklers 22 and 24. The fifth position of deck 1 is used to complete a circuit from the terminal 114 to the solenoid valve 122.

The wiper-arm contacts of deck H of switch 112 and deck 3 of switch 126 are part of a circuit for returning the respective switches to their starting positions. This circuit includes single-pole double-throw switches 138 and 140 arranged in series with the rectifier 108. The switches 138 and 140 are shown in the home or starting position. Stepping switch 112 to position one operates a mechanical connection (not shown) that closes the switch 138. Similarly, stepping the switch 126 to position one causes a mechanical connection (again not shown) to change the switch 140 from the position shown to a position that completes a circuit from the wiper arm of deck 3 to the rectifier 108.

Stepping the accumulator switch 112 to either position two or three energizes the coil 120 to close the contacts 120–1 and 120–2 to establish a circuit to a coil 142 of a motor controller having three normally open contacts 142–1, 142–2, and 142–3 in power lines from the terminals 114, 116 and 118 to the pump motor 38P. This coil will not be energized, however, unless the wheel switch 15 is closed and unless a water-supply switch 144 is also closed. Closing the contact 120–1 and the switches 15 and 144 also establishes a circuit from the terminal 114 to a relay coil 146 through a rail switch 148. The rail switch 148 will be closed once for each revolution of a trolley 56 around the continuous track 58. Coil 146 is part of a relay having one normally open contact 146–1 in a line between the rectifier 108 and the coil 130.

Switch 15 is a double-pole double-throw switch which establishes the circuit to the coils 142 and 146, and also controls the operation of the signal light 82. In the position shown, the switch 15 connects an arrow light 150 to the terminal 114 through the contact 120–1. When a vehicle has been properly positioned in the washing station, the switch 15 moves from the position shown, thereby turning off the light 150 and connecting a stop light 152 to the terminal 114. This signals a driver that his vehicle is in the proper position for washing.

For those stations that include wheel-washing facilities, a time-delay relay coil 154 is included in the circuit to the terminal 114 established by the contact 120–1. A wheel-washing switch 16 is in series with the coil 154 which operates two normally open contacts 154–1 and 154–2, and two normally closed contacts 154–3 and 154–4. Closing the contact 154–1 connects the coil 142 directly to the terminal 114 bypassing the circuit that includes contacts 120–1 and 120–2, and switches 15 and 144. Closing the contact 154–2 energizes a solenoid valve 156 that controls the dispensing of a high-pressure cleaning solution from the nozzle arrays 76 and 78. Opening the normally closed contacts 154–3 and 154–4 disconnects the trolley motor 74 and a master solenoid valve 158, respectively, from the cold side of the contact 142–1.

In operation, a customer approaches the washing station and inserts the correct number of coins in the coin box 55. If 50 cents is required for a car wash without wax, the customer inserts either two 25 cent pieces in the slot 52 or one 50 cent piece in the slot 54. By an appropriate coin-selecting mechanism, the operation of which is well understood, the switch 106 closes momentarily once for a 25 cent piece and twice for a 50 cent piece. Closing the switch 106 one time energizes the coils 110 and 130 to step the switches 112 and 126 to their first position. Stepping the switch 112 to position one breaks the circuit from the switch 106 to the coil 130 through deck G. The energizing circuit of the coil 130 is also interrupted by stepping the switch 126 to position one. With the switch 126 in position one, the solenoid valves 134 and 136 are energized, thus allowing hot water and detergent to flow into the line 160. Note, however, that this mixture of hot water and detergent does not flow past the solenoid valve 158 which is deenergized through the open contact 142–1. Inserting another 25 cent piece in the slot 152, or if a 50 cent piece had been inserted in the slot 54, causes the switch 106 to be closed a second time, thereby energizing the coil 110 and stepping the switch 112 to position two. In the second position of switch 112, a circuit is completed through deck A to energize the coil 120 and close the normally open contacts 120–1 and 120–2. The "Wash Only" light 104 turns on with the switch 112 in position two through deck B, and the solenoid 100 is deenergized by movement of the wiper arm of deck C to the second position. Deenergizing the solenoid 100 causes the shutter 94 to be rotated in a position to block the slot 54, thus preventing additional 50 cent pieces from being inserted into the coin box 55.

A program has now been established by the accumulator switch 112 for a particular washing and rinsing sequence for cleaning a vehicle driven into the washing station. As the vehicle moves over the switch 16, it closes thereby energizing the time delay coil 154 to close contacts 154–1 and 154–2. Closing the contact 154–1 energizes the coil 142 to close the contacts 142–1, 142–2, and 142–3 to energize the pump motor 38P. Note, that the trolley motor 74 and the master solenoid valve 158 are not energized at this time as a result of opening the normally closed contacts 154–3 and 154–4. However, closing the contact 154–2 energizes the solenoid valve 156 and the pump 38 causes a high-pressure cleaning fluid to be dispensed from the nozzle arrays 76 and 78. After a predetermined period of time, the time-delay relay times out and the contacts 154–1 and 154–2 are again opened. The driver continues to move his vehicle into the washing bay. When the rear wheels contact the pressure switch 16, the coil 154 is again energized, and the wheel-washing cycle is repeated.

The driver continues into the washing bay until his front left tire closes the switch 15, thereby turning off the arrow light 150 and turning on the stop light 152. The coil 142 will also be energized through the switch 144 which has been previously closed. Energizing the coil 142 again connects the motor 38P to the terminals 114, 116, and 118 to start the pump 38. The contacts 154–3 and 154–4 are now closed and the trolley motor 74 and solenoid valve 158 are operational. The water-detergent mixture in the line 160 is dispensed under high pressure through the rotating sprinklers 22 and 24 and the trolley 56 moves around the continuous track 58. As the trolley 56 completes one revolution around the track 58, it closes the rail switch 148 thereby energizing the coil 146 to close the contact 146–1. Closing the contact 146–1 completes a circuit from the rectifier 108 to energize the coil 130 to step the switch 126 to position two. In position two, the switch 126 provides the identical operation as position one; the water-detergent mixture is again applied to the vehicle through the sprinklers 22 and 24. As the trolley again closes the rail switch 148 at the completion of the second revolution, the coil 130 is energized to step the switch 126 to position three. In position three, the solenoid valves 134 and 136 are deenergized, thereby shutting off the flow of hot water and detergent through the line 160. However, cold water in the line 160a continues to be dispensed from the rotating sprinklers 22 and 24 and a clear water rinse is applied to the vehicle. This removes the water-detergent mixture and the dirt loosened during the washing cycle. When the trolley 56 passes the rail switch 148 the third time, the coil 130 is again energized to step the switch 126 to position four. Since the program established by the switch 112 does not call for a wax application, the circuit to the solenoid valve 122 will not be complete through deck E, and the fourth revolution of the trolley 56 is identical to the third.

Upon completion of the fourth revolution of the trolley 56 around the track 58, the rail switch 148 is again closed to energize the coil 130 and step the switch 126 to position five. In position five, a circuit will be complete through deck 3 and through the switch 140 which has previously been moved, as explained earlier, to its second position. The coil 130 is energized through the interrupter contact 132. The interrupter contact 132 remains closed only momentarily and then opens. However, it remains closed for a time sufficient to step the switch 126 to position six. The coil 130 is again energized and the switch 126 stepped to the home or starting position, as illustrated.

As the switch 126 reaches the home position, the switch 140 moves to the position shown, thereby completing a circuit through the switch 138 (which has previously been closed by operation of the switch 112 as explained) to energize the coil 110 through deck H and the interrupter contact 128. Energizing the coil 110 causes the switch 112 to step to position three. Subsequent energization of the coil 110 steps the switch 112 to position four and finally to the home or starting position. In position four, a circuit is complete from the terminal 114 through deck F to operate the counter 124. Again, the interrupter contact 128 remains closed for a period of time sufficient to allow the switch 112 to step to the next position. When the switch 112 has reached the starting position, the switch 138 opens and the entire system is shut down and ready for another cycle.

If the customer desires a wash and wax, he inserts an additional 25 cent piece in the coin slot 52 to step the accumulator switch 112 to position three. With the switch 112 in position three, decks A and C complete circuits as described previously. Deck B now, however, turns on the "Wash and Wax" light 102 and deck D deenergizes the solenoid 92 to cause the shutter 86 to rotate into a position to block the coin slot 52. Thus, both coin slots 52 and 54 are blocked by respective shutters 86 and 94.

The program established by the accumulator switch 112 is identical for the first three revolutions of the trolley 56 around the track 58. At the completion of the third revolution, the rail switch 148 closes to step the switch 126 to position four. In position four, a circuit is complete through deck 1 of switch 126 and deck E of switch 112 to energize the solenoid valve 122. This permits a liquid wax to be mixed with the cold water during the fourth revolution of the trolley 56 around the track 58. At the completion of the fourth revolution of the "Wash and Wax" program, the switch 148 is closed to step the switch 126 to position four. Switch 126 then returns itself to the starting position and establishes the circuit for returning the switch 112 to a starting position. The cycle is complete and the wash bay ready for another vehicle.

While only one embodiment of the invention, together with modifications thereof, has been described and illustrated in the accompanying drawings, it will be evident that further modifications are possible without departing from the scope of the invention as set forth in the appended claims.

I claim:

1. A coin-actuated control system for a vehicle-washing station including rotating sprinklers supported by a motor-driven trolley on a continuous track comprising:

an accumulator multideck stepping switch for establishing a program of operation in accordance with the value of coins actuating a coin switch, sequencing means having several positions for controlling the operation of the motor-driven trolley and cleaning solutions to the rotating sprinklers, said sequencing means actuated to a first position by said accumulator stepping switch, switching means actuated by the movement of the motor driven trolley around the supporting track to energize said sequencing means to the various positions thereof, and circuit means for returning said sequencing means and said accumulator stepping switch to a starting position after completion of a washing cycle.

2. A coin-actuated control system for a vehicle-washing station as set forth in claim 1 wherein said sequencing means includes a three-deck stepping switch.

3. A coin-actuated control system for a vehicle-washing station as set forth in claim 2 wherein said switching means includes a rail switch, closed by the movement of the trolley, in series with a first relay including a contact in series with the actuator of the sequence stepping switch.

4. A coin-actuated control system for a vehicle-washing station as set forth in claim 3 including a second relay connected to the first deck of the accumulator switch and energized in the second position of said accumulator for establishing a circuit to said switching means.

5. A coin-actuated control system for a vehicle-washing station as set forth in claim 4 including a wheel-washing control in the circuit established by the second relay and actuated by a vehicle moving into the washing station prior to a washing cycle.

6. A coin-actuated control system for a vehicle-washing station including a pump for supplying a pressurized fluid to rotating sprinklers supported by a motor-driven trolley on a continuous track comprising:
   an accumulator multideck stepping switch for establishing a program of operation for the washing station in accordance with the value of coins actuating a coin switch,
   a sequencing multideck stepping switch for controlling the number of revolutions of the motor-driven trolley around the continuous track for a given cycle, and cleaning solutions to the rotating sprinklers, said sequencing stepping switch actuated to a first position by said accumulator switch,
   control means connected to the first deck of said sequencing switch and energized in the first and second positions thereof for controlling hot water and detergent through the rotating sprinklers,
   pump control means connected to the second and third positions of the first deck of the accumulator switch for establishing a circuit to said pump,
   a vehicle switch close by a vehicle moving into a washing position to energize the pump-control means, thereby starting a washing cycle, and
   switching means actuated by the movement of the motor-driven trolley around the continuous track to energize said sequencing switch to the various positions thereof.

7. A coin-actuated control system for a vehicle-washing station as set forth in claim 6 including a wheel-washing control system as part of the pump-control means energized by the movement of a vehicle over a vehicle switch.

8. A coin-actuated control system for a vehicle-washing station as set forth in claim 6 including wax-control means energized through the first deck of said sequencing switch when in the fourth position thereof and through the fourth deck of said accumulator when in the third position.

9. A coin-actuated control system for a vehicle-washing station as set forth in claim 6 wherein said switching means includes a rail switch actuated by the movement of said trolley in series with a relay including a contact for energizing a positioning solenoid of said sequencing switch.

10. A coin-actuated control system for a vehicle-washing station as set forth in claim 6 including circuit means for returning said sequencing switch and said accumulator switch to a starting position after completion of a washing cycle.

11. A coin-actuated control system for a vehicle-washing station having a source of cleaning solutions to be supplied to rotating sprinklers supported by a motor-driven trolley on a guide track comprising:
   accumulator means for establishing a program of operation in accordance with the value of coins actuating a coin switch,
   sequence means for establishing the sequence of operation of the motor-driven trolley and the cleaning solutions through the rotating sprinklers, said sequencing means initially actuated by said accumulator means,
   control means energized through said sequencing means for controlling the supply of the cleaning solutions to the rotating sprinklers,
   switching means actuated by the movement of the motor driven trolley around the supporting track to actuate said sequencing means to the various positions thereof, and
   circuit means for returning said sequencing means and said accumulator means to a starting position after completion of a washing cycle.

12. A coin-actuated control system for a vehicle-washing station as set forth in claim 11 including wax-control means energized through said sequencing means and through said accumulator means for one program established thereby to supply a wax solution to the rotating sprinklers.

13. A coin-actuated control system for a vehicle-washing station as set forth in claim 11 wherein said sequencing means includes multideck stepping switch.

14. A coin-actuated control system for a vehicle-washing station as set forth in claim 11 including control means connected to said accumulator means for establishing a circuit in response to said switching means.

15. A coin-actuated control system for a vehicle-washing station as set forth in claim 11 including a wheel-washing control in the circuit established by said control means and actuated by a vehicle moving into the washing station at the commencement of a washing cycle.

16. A control system for a vehicle-washing station actuated by the operation of a coin switch and including a source of cleaning solution supplied through rotating sprinklers supported by a motor-driven trolley on a guide track comprising:
   an accumulator multideck stepping switch for establishing a program of operation in accordance with the value of coins actuating the coin switch,
   sequencing means actuated to an initial position by said accumulator stepping switch, said sequencing means having a plurality of positions for establishing the sequence of operation of the motor-driven trolley and the cleaning solutions to the rotating sprinklers,
   switching means actuated by the movement of the motor-driven trolley around the supporting track to energize said sequencing means to the various positions thereof, and
   circuit means for returning said sequencing means and said accumulator stepping switch to a starting position at the completion of a washing cycle.

17. In a control system for a vehicle-washing station as set forth in claim 16 including a wheel-washing control system energized through said accumulator stepping switch by the movement of a vehicle over a vehicle switch.

18. A control system for a vehicle-washing station as set forth in claim 16 including wax-control means energized through said sequencing means and said accumulator for one program established therein.

19. A control system for a vehicle-washing station actuated through a coin switch and including a pressurized fluid supply connected to rotating sprinklers supported by a motor-driven trolley on a guide track comprising:
   an accumulator multideck stepping switch for establishing a program of operation for the washing station in accordance with the value of coins actuating the coin switch,
   a sequencing multideck stepping switch for establishing the number of revolutions of the motor-driven trolley around the guide track for a given cycle and a particular cleaning solution to the rotating sprinklers, said sequencing stepping switch actuated to an initial position by said accumulated switch,
   control means connected to one deck of said sequencing switch and energized in selected position thereof for controlling a cleaning solution through the rotating sprinklers,
   control means connected to terminal positions of one deck of the accumulator switch for establishing a circuit to the pressurized supply,
   a vehicle switch closed by a vehicle moving into a washing position to energize said control means, thereby starting a washing cycle, and
   switching means actuated by the movement of the motor-driven trolley around the continuous track to energize said sequencing switch to the various positions thereof.

20. A control system for a vehicle-washing station as set forth in claim 19 including circuit means for returning said sequencing switch and said accumulated switch to a starting position after completion of a washing cycle.